Feb. 27, 1934.  C. CONE  1,948,563
APPARATUS FOR PRODUCING SHEET GLASS
Filed May 31, 1930
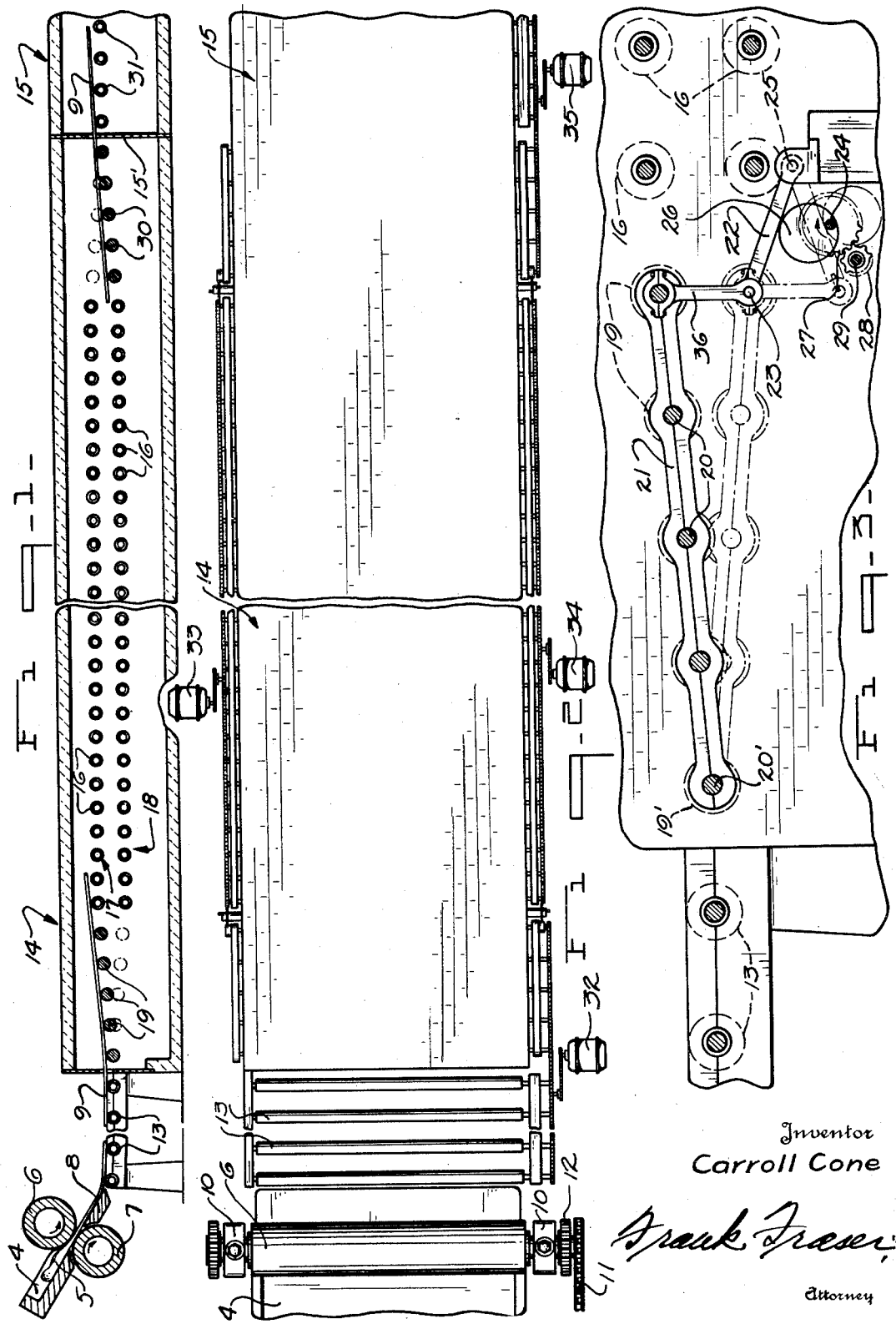
Inventor
Carroll Cone
Frank Fraser,
Attorney Patented Feb. 27, 1934

1,948,563

UNITED STATES PATENT OFFICE 1,948,563

APPARATUS FOR PRODUCING SHEET GLASS

Carroll Cone, Toledo, Ohio, assignor to Libbey-Owens-Ford Glass Company, Toledo, Ohio, a corporation of Ohio Application May 31, 1930. Serial No. 458,163

12 Claims. (Cl. 49—3)

The present invention relates to a process and apparatus for producing sheet or plate glass.

According to one process of manufacturing sheet glass, a plurality of successive sheets of glass are intermittently rolled at predetermined intervals from a series of charges or masses of molten glass, the molten glass being preferably melted and refined within suitable receptacles or pots and poured therefrom onto a receiver from where it is moved to and passed between a pair of forming rolls which function to reduce the glass to a sheet of substantially predetermined and uniform thickness. In such process, it is desirable, from both the standpoint of quality and production, that the glass sheets be formed at a relatively high rate of speed, after which the speed of travel thereof be materially reduced so that the sheets will be permitted to move at a relatively slower speed during annealing in order that the annealing leer used need not be increased in length in proportion to the increase in the speed of formation of the sheet.

An important object therefore of this invention is the provision of a process and apparatus whereby a mass of molten glass may be rapidly reduced to sheet form and the sheet subsequently annealed while traveling at a relatively slower rate of speed.

Another object of the invention is the provision of a process and apparatus wherein the speed of forward travel of the sheet may be reduced from a relatively high forming speed to a relatively slower annealing speed easily and conveniently and in such manner that the successive sheets passed into and through the annealing leer will be disposed relatively close together so that the full length of leer may be utilized.

Another object of the invention is the provision of a process and apparatus wherein successive sheets of glass are adapted to be intermittently produced at a relatively high rate of speed, alternate sheets formed being caused to travel through different horizontal paths, the forward speed of the sheets being reduced during such travel, after which they are directed to and caused to travel in a common horizontal path through an annealing leer at such reduced speed.

Still another object of the invention is the provision of novel and improved means for receiving the glass sheets from the forming mechanism at a relatively high rate of speed, reducing the forward speed of travel thereof, and then feeding them into an annealing leer at such reduced speed.

A more specific object of the invention is the provision of apparatus of the above described character embodying superimposed transfer runways interposed between the sheet forming mechanism and leer, means being provided for directing the sheets formed onto either runway, and means being also provided for directing the sheets from both runways onto a common forwarding means arranged within the leer for carrying the sheets therethrough.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through apparatus constructed in accordance with the present invention, showing the forward end portion only of the annealing leer proper, Fig. 2 is a plan view thereof, and Fig. 3 is a side elevation disclosing operating means for a portion of the apparatus.

Referring to the drawing, 4 designates a receiver or support adapted to receive thereupon a mass or charge of molten glass 5 which is to be reduced to sheet form. Associated with one end of the receiver 4 are the sheet forming rolls 6 and 7 arranged relative to one another to create a sheet forming pass therebetween through which the molten glass 5 is moved and reduced to a sheet 9 of substantially predetermined and uniform thickness. As pointed out above, it is desirable that the sheet of glass 9 be formed at a relatively high rate of speed and the rolls 6 and 7 are consequently rotated in a manner to rapidly reduce the mass of molten glass 5 to sheet form. The forming rolls may be supported at each end by bearing brackets 10, with one of said rolls being positively driven in any desired manner such as through a sprocket and chain drive 11, and the other roll driven from the first roll through intermeshing gears 12 carried by the roll shafts.

As the glass sheet 9 leaves the forming rolls, it passes downwardly over an inclined apron or slab 8 and onto a horizontal conveyor composed of a series of horizontally aligned rolls 13 and then on through the receiving or transfer section 14 of the annealing leer into the leer proper 15, said transfer section being separated from the leer proper by a vertical partition wall 15' having a horizontal slot therein through which the sheet may pass. The transfer section 14 of the leer contains a large number of rolls 16 arranged in two superimposed horizontal lines 17 and 18 to form upper and lower runways respectively. According to this invention, alternate glass sheets formed by the rolling mechanism are adapted to be delivered to the upper and lower runways and for this purpose there is provided a directing conveyor section composed of a series of rolls 19, movable into operative relation with respect to either runway dependent upon to which runway the sheet is to be passed.

As pointed out above, the rolls 19 are movable to supply the glass sheets to either of the runways 17 or 18 and these rolls may be mounted and operated by a construction such as is disclosed in Fig. 3 of the drawing. Thus, the rolls 19 are carried by shafts 20 journaled at each end in a member 21, the members at opposite sides of the leer being pivotally mounted at their forward ends upon the shaft 20' of the first roll 19'. In other words, the first roll 19' is stationary and the rolls 19 movable as a unit about the axis of rotation thereof. Pivotally connected to the shaft 20 of the end roll 19 remote from the forming mechanism is a link 36 to the opposite end of which is pivoted as at 23 a second link 22 in turn pivoted at its other end to a fixed bracket as indicated at 25. Positioned beneath the link 22 and adapted to engage the same is an eccentric 26 mounted upon a shaft 24 carrying a gear 27 meshing with a drive pinion 28 mounted upon drive shaft 29.

From the above, it will be seen that upon rotation of shaft 29, the eccentric 26 will be driven through intermeshing gears 27 and 28 and the eccentric engaging link 22 will effect the raising and lowering thereof together with the series of rolls 19. Thus, when the eccentric 26 is rotated in the direction indicated by the arrow to the position shown by the full lines, the links 22 and 36 will be actuated to raise the rolls 19 to the position indicated by the full lines in Fig. 1 of the drawing so that they will be in cooperative relation with respect to the upper runway 17, whereby to direct the sheet 9 thereupon. On the other hand, when the eccentric is rotated in the reverse direction, the links 22 and 36 will be actuated to lower the rolls 19 to bring them into cooperative relation with respect to the lower runway as indicated by the broken lines, whereby to direct the sheet being formed thereupon.

Arranged at the opposite end of the runways 17 and 18 are a series of rolls 30 constituting a second transfer section similar to that formed by rolls 19 and which is adapted to operate in substantially the same manner so as to transfer the glass sheets from the runways onto the rolls 31 arranged within the leer 15 for supporting and carrying the sheets therethrough. In other words, the rolls 30 are also movable into cooperative relation with respect to either of the runways 17 and 18.

The rolls 13 and 19 are adapted to be driven at a constant relatively high rate of speed substantially equal to the speed of formation of the sheet, said rolls being driven, as herein shown, from a motor 32 through suitable chain and sprocket connections. The rolls 16 of runways 17 and 18 are adapted to be driven first at a relatively high rate of speed substantially equal to the speed of sheet formation so as to receive the glass sheet being formed thereupon, after which they are to be driven at a reduced speed so as to effect a reduction in the speed of travel of the sheet to the desired annealing speed. Therefore, the rolls 16 of the upper and lower runways 17 and 18 may be driven from the variable speed motors 33 and 34 respectively through suitable chain and sprocket connections or in any other desired manner. The rolls 30 and 31 are adapted to be driven at the constant slow annealing speed from a motor 35 also through suitable drive connections.

In the operation of the apparatus, the series of rolls 19 are first moved about the axis of the first roll 19' so as to bring the said rolls into proper cooperative relation with the desired runway 17 or 18, depending upon to which runway the sheet about to be formed is to be passed. For the purposes of illustration, the rolls 19 are shown in full lines in Fig. 1 in cooperative relation with the rolls of the upper runway 17. A mass or charge of molten glass 5 is then adapted to be deposited upon the support or receiver 4 and moved to and between the sheet forming rolls 6 and 7 which serve to reduce the glass to sheet form as indicated at 9, said sheet being then passed over the conveyor rolls 13 and directing rolls 19 onto the rolls 16 of the upper runway 17. As pointed out above, the sheet of glass is adapted to be formed at a relatively high rate of speed and therefore, during the forming operation, the forming rolls 6 and 7, conveyor rolls 13 and 19, and also the rolls 16 of the upper runway 17 are adapted to be driven in unison at a relatively high rate of speed so that the glass will be carried forwardly onto said runway at a speed equal to its speed of formation. However, after the entire sheet is received upon runway 17, the rotation of the rolls 16 thereof is reduced so as to reduce the forward speed of travel of the sheet. The sheet then passes from the runway 17 onto the rolls 30 which, during this period of the operation, assume the position indicated by the broken lines so that they are also in cooperative relation with respect to the upper runway 17, said sheet being then passed into the leer 15 upon the leer rolls 31. When the speed of rotation of rolls 16 is reduced, the speed is reduced to a speed equal to that of the rolls 30 and 31 which are being constantly driven at the speed at which the sheet is intended to travel in annealing.

As soon as the entire sheet is received upon the runway 17, the rollers 19 are moved to the position indicated by the broken lines in Fig. 1 so that the next sheet formed will be passed onto the runway 18 and after the sheet leaves the upper runway 17 the rolls 30 are also moved into cooperative relation with respect to the lower runway 18. As one glass sheet is being passed from one runway into the annealing leer at a relatively slow speed, another sheet is being passed from the forming means onto the other runway at a relatively high speed. Thus, by properly timing the speed of formation of the sheets and also the annealing speed and the interim between the formation of succeeding sheets, the said sheets can be passed through the leer in close proximity to one another so that the full length of leer will be utilized.

From the above, it will be seen that there has been provided an apparatus embodying superposed transfer runways interposed between the rolling machine and leer, means being provided for directing alternate sheets formed upon the different runways at the speed of formation thereof together with means for reducing the speed of travel of the sheets while on said runways and means for directing the sheets from the runways at such reduced speed onto a common forwarding means arranged within the leer and operating to carry the sheets therethrough.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means for directing the successive sheets formed onto either of said runways, means for driving said conveyor means at one speed, a second conveyor means for directing the sheets from said runways onto the conveying means in said leer, and means for driving said second conveyor means at a speed different from the speed of the first mentioned conveyor means.

2. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means for receiving the sheets from the forming means and movable into operative relation with respect to either runway dependent upon the runway to which the sheets are to be supplied, means for driving said conveyor means at one speed, a second conveyor means adjustable to deliver the sheets from either runway onto the conveying means in said leer, and means for driving said second conveyor means at a speed different from the speed of the first mentioned conveyor means.

3. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means for receiving the sheets from the forming means, means for driving said conveyor means at one speed, a second conveyor directing them onto either runway, and means movable into cooperative relation with respect to either runway for delivering the sheets therefrom onto the conveying means in said leer, and means for driving said second conveyor means at a speed different from the speed of the first mentioned conveyor means.

4. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means for receiving the sheets from the forming means and movable into operative relation with respect to either runway dependent upon the runway to which the sheets are to be supplied, means for driving said conveyor means at one speed, a second conveyor means movable into cooperative relation with respect to either runway for delivering the sheets therefrom onto the conveying means in said leer, and means for driving said second conveyor means at a speed different from the speed of the first mentioned conveyor means.

5. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means disposed between the runways and forming means for directing the successive sheets formed onto either of said runways, means for driving said conveyor means at one speed, a second conveyor means positioned between the runways and leer for directing the sheets from said runways onto the conveying means in said leer, and means for driving said second conveyor means at a speed different from that of the first mentioned conveyor means.

6. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means disposed between the runways and forming means for receiving the sheets from the latter and movable into operative relation with respect to either runway dependent upon the runway to which the sheets are to be supplied, means for driving said conveyor means at one speed, a second conveyor means positioned between the runways and leer and adjustable to deliver the sheets from either runway onto the conveying means in said leer, and means for driving said second conveyor means at a speed different from that of the first mentioned conveyor means.

7. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means disposed between the runways and forming means for receiving the sheets from the latter and for directing them onto either runway, means for driving said conveyor means at one speed, a second conveyor means positioned between the runways and leer and movable into cooperative relation with respect to either runway for delivering the sheets therefrom onto the conveying means in said leer, and means for driving said second conveyor means at a speed different from that of the first mentioned conveyor means.

8. In apparatus for the manufacture of sheet glass, means for forming successive sheets of glass, an annealing leer having conveying means therein for carrying the sheets therethrough, a plurality of superposed runways arranged within the leer in advance of said conveying means, conveyor means disposed between the runways and forming means for receiving the sheets from the latter and being movable into cooperative relation with respect to either runway dependent upon the runway to which the sheets are to be supplied, means for driving said conveyor means at one speed, a second conveyor means positioned between the runways and leer and also movable into cooperative relation with respect to either runway for delivering the sheets therefrom onto the conveying means in said leer, and means for driving said second conveyor means at a speed different from that of the first mentioned conveyor means.

9. In apparatus for the manufacture of sheet glass, means for forming successive sheets of glass, a plurality of superposed runways, conveyor means for receiving the sheets from the forming means and delivering them to said runways, means for driving said conveyor means at one speed, an annealing leer, conveying means disposed within said leer and common to both runways, a second conveyor means for directing the sheets from said runways to said common conveying means, and means for driving said second conveyor means at a speed different from that of the first mentioned conveyor means.

10. In apparatus for the manufacture of sheet glass, means for forming successive sheets of glass, a plurality of superposed runways, conveyor means for receiving the sheets from the forming means and delivering them to said runways, means for driving said conveyor means at one speed, an annealing leer, conveying means disposed within the leer common to both runways, a second conveyor means interposed between said runways and leer conveying means and movable into cooperative relation with respect to either runway for delivering the sheets therefrom to said common conveying means, and means for driving said second conveyor means at a speed different from that of the first mentioned conveyor means.

11. In apparatus for the manufacture of sheet glass, means for forming successive sheets of glass, an annealing leer having means therein for conveying the sheets therethrough, a plurality of superposed runways interposed between the forming means and leer, a pivotally mounted transfer conveyor section disposed between the runways and forming means for receiving the sheets from the latter and being movable into cooperative relation with respect to either runway dependent upon the runway to which the sheets are to be supplied, and a second pivotally mounted transfer conveyor section positioned between the runways and leer and also movable into cooperative relation with respect to either runway for delivering the sheets therefrom onto the conveying means in said leer.

12. In apparatus for the manufacture of sheet glass, means for forming successive sheets of glass, an annealing leer having means therein for conveying the sheets therethrough, a plurality of superposed runways interposed between the forming means and leer, a transfer conveyor section disposed between the runways and forming means for receiving the sheets from the latter, means for pivotally mounting said conveyor section at the end thereof adjacent the forming means, means connected with the opposite end of the conveyor section for moving the same vertically to bring it into cooperative relation with respect to either runway dependent upon the runway to which the sheets are to be supplied, a second transfer conveyor section positioned between the runways and leer, means for pivotally mounting said second conveyor section at the end thereof adjacent said leer, and means connected with the opposite end thereof for moving the same vertically into cooperative relation with respect to either runway for delivering the sheets therefrom onto the conveying means within the leer.

CARROLL CONE.